US012045636B2

(12) United States Patent
Semenei

(10) Patent No.: US 12,045,636 B2
(45) Date of Patent: Jul. 23, 2024

(54) PROJECT-BASED SCHEMA FOR INTERACTIVE FRAMEWORK OF COMMUNICATION SYSTEM

(71) Applicant: Aleksei Semenei, Los Angeles, CA (US)

(72) Inventor: Aleksei Semenei, Los Angeles, CA (US)

( * ) Notice: Subject to any disclaimer, the term of this patent is extended or adjusted under 35 U.S.C. 154(b) by 0 days.

(21) Appl. No.: 17/964,263

(22) Filed: Oct. 12, 2022

(65) Prior Publication Data

US 2024/0126571 A1    Apr. 18, 2024

(51) Int. Cl.
*G06F 3/048* (2013.01)
*G06F 3/0482* (2013.01)
*G06F 9/445* (2018.01)
*G06F 9/451* (2018.01)

(52) U.S. Cl.
CPC .............. *G06F 9/451* (2018.02); *G06F 3/048* (2013.01); *G06F 3/0482* (2013.01); *G06F 9/44526* (2013.01)

(58) Field of Classification Search
None
See application file for complete search history.

(56) References Cited

U.S. PATENT DOCUMENTS

| | | | |
|---|---|---|---|
| 2010/0332509 A1* | 12/2010 | Rogers | G06Q 10/06 707/769 |
| 2013/0024815 A1* | 1/2013 | O | H04M 1/72472 715/811 |
| 2013/0346907 A1* | 12/2013 | Arend | G06F 3/0481 715/779 |
| 2015/0370425 A1* | 12/2015 | Chen | G06F 3/04842 715/830 |
| 2018/0189736 A1* | 7/2018 | Guo | G06Q 10/06 |
| 2019/0239037 A1* | 8/2019 | Hung | H04L 65/403 |
| 2021/0194838 A1* | 6/2021 | Agarwal | H04L 51/04 |
| 2022/0066843 A1* | 3/2022 | Gogate | G06F 21/31 |
| 2023/0012141 A1* | 1/2023 | Kamath | G06F 3/0482 |

* cited by examiner

*Primary Examiner* — Xuyang Xia
(74) *Attorney, Agent, or Firm* — Mahamedi IP Law LLP

(57) ABSTRACT

A communication system to provide individual users of a group with an interactive framework that implements a project-based schema to arrange nodal elements representing resources of a given project.

20 Claims, 7 Drawing Sheets

PROJECT-BASED SCHEMA FOR INTERACTIVE FRAMEWORK OF COMMUNICATION SYSTEM

TECHNICAL FIELD

Examples described herein relate to a project based schema for an interactive framework of a communication system.

BACKGROUND

The use of enterprise communication platforms has significantly grown in recent years. Generally, these platforms enable users to communicate with one another, either individually or through groups, as well as to utilize different types of applications.

DETAILED DESCRIPTION

Figure 1:
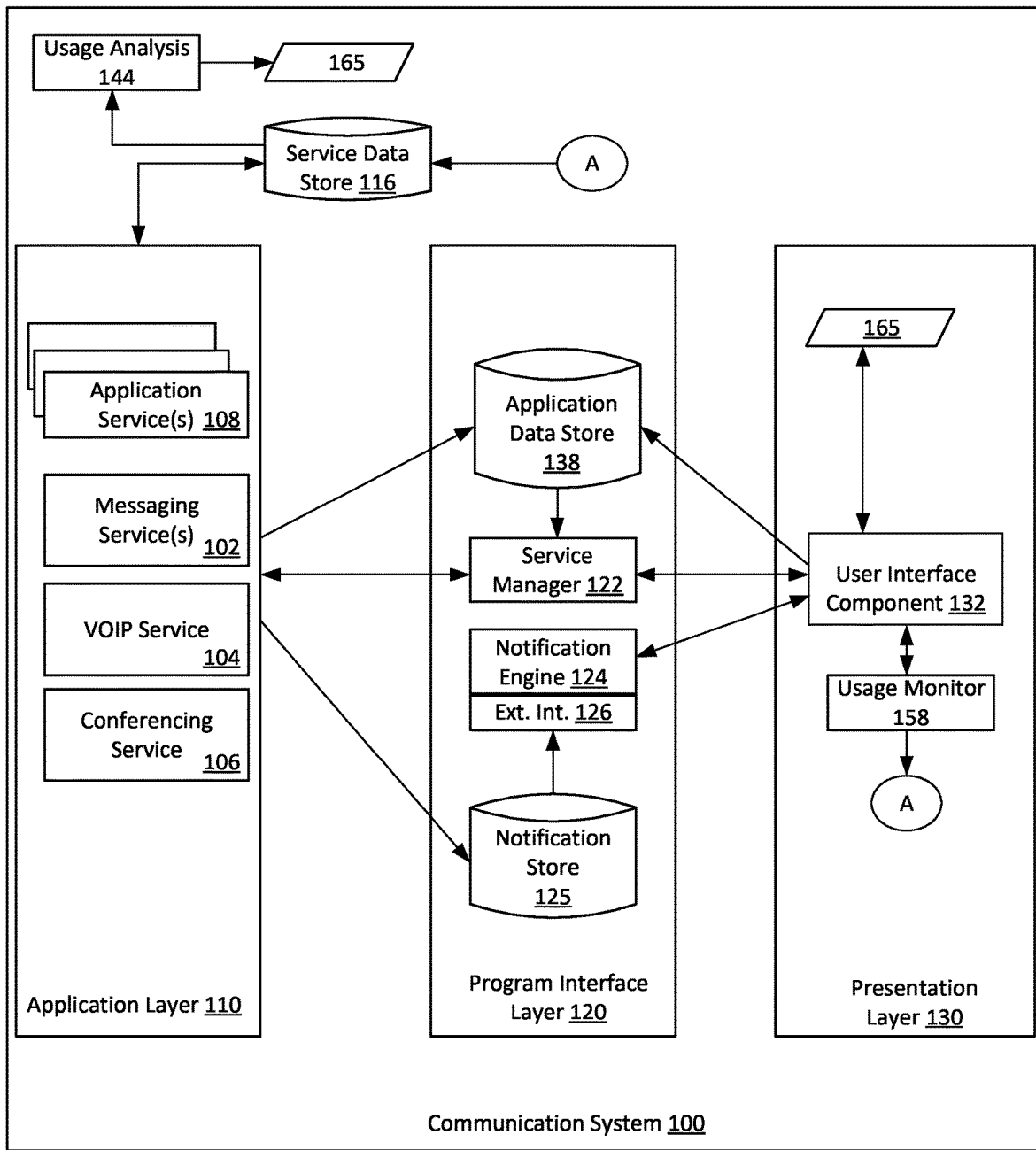
FIG. 1 illustrates a network-based communication system for providing project-based application services to end users, according to one or more embodiments.

Embodiments provide a communication system for providing a project-based environment for individual users and groups. In some examples, a communication system provides users with an interactive user-interface that is structured to organize tools and resources in accordance with a project-based schema. Among other technical benefits, the user-interface can operate to provide prioritized, project-based data sets to the user in a manner that promotes user efficiency. Further, as described with some examples, the user-interface can be implemented in a manner that optimizes efficiency and use of computing resources.

Among other technical benefits, embodiments include a communication system that operates to provide application services and resources in a project-based environment. Further, the communication system 100 provides a user-interface that organizes the user's activities and resources by project.

Embodiments further include a communication system that provides one or multiple aggregated notification views. In some examples, a communication system provides individual users with a first notification aggregation view to display notifications generated by multiple application services. As an addition or variation, the communication system provides individual users with a second notification aggregation view that aggregates notifications generated by multiple application services which are implemented as part of multiple projects which the user is associated with. In this way, embodiments provide for a communication system that organizes and presents notifications generated from multiple application services and for multiple projects, to allow users to have more focus on notifications, separate from other types of application content. In examples, notifications include messages generated by application services as a response to predefined events or conditions. As such, application services can generate notifications that include, for example, content (e.g., text content identifying a message, entry or application update), indicators (e.g., status indicator indicative of whether there is new application content which a user should view, a number of new messages, a missed event, etc.), mentions that signify when a user is mentioned by another use in connection with an application service, and/or other types of information that are indicative of an event/condition that occurs with respect to execution of an application service.

According to some embodiments, a communication system is implemented to provide multiple application services to a group of users, where each user of the group is able to access each of the multiple application services using a corresponding computing device. For each user of the group, the communication system generates, on the respective computing device of the user, a user-interface to render multiple content views, where each of the multiple content views includes application content generated by at least one of the multiple application services. The user-interface includes an interactive framework that includes a plurality of nodal elements that are individually selectable to cause a corresponding content view to be displayed. Further, the interactive framework is structured in accordance with a schema that represents each of one or more projects as a corresponding primary nodal element. For at least a first project, one or more application services that are associated with the first project are each represented as a sub-nodal elements of the primary nodal element that represents the first project.

Further, the communication system can provide tools (e.g., application services, plugins, external tools, etc.) and resources for use that is separate from a project-based environment. For example, the application services can be used by individuals for personal management, not directly related to specific projects. The schema for the interactive framework can integrate nodal elements for the user's personal use, separate from nodal elements used with individual projects. For example, an individual user can assign a primary nodal element to a self-defined category (e.g., personal use, family, etc.), and further assign alternative tools and resources for such alternative purposes. In such cases, the categorical designations of the user can be represented as primary nodal elements of the interactive framework.

In some examples, a communication system is implemented to provide multiple application services for a group of users, where each user of the group is able to access each of the multiple application services using a corresponding computing device. For each user of the group, the communication system provides the multiple application services by generating, on the user's computing device, a user-interface that includes multiple content views. In examples, each of the multiple content views including application content generated by at least one of the multiple application services. Additionally, the communication system operates to maintain one or more notification aggregation view for each user account, where individual users can view notifications generated by different application services and/or for different projects.

In examples, the term "project", as used in connection with a communication system such as described by examples, means a logical grouping of tools and resources that share a user-specified attribute. In examples, the logical grouping of tools and resources for individual projects can include (i) applications, such as application services, plugins and instances thereof, (ii) personnel activities, such as provided by members who perform activities through the communication system in association with the project, and (iii) data sets, such as repositories, directories, files and other data collections. The user-specified attribute can correspond to a unique project identifier. As described, examples provide for a communication system that enables individual users to create or join projects in furtherance of a user or group objective.

In examples, the term "optimal" or variants thereof (e.g., "optimized") and related terms (e.g., "minimum", "maximum") means a result or outcome that is achieved through deliberate or intelligent consideration. Accordingly, such terms do not necessarily mean a result or outcome is achieved that is most optimal, but rather can mean the result or outcome is more desirable with respect to the particular facet or parameter as compared to an alternative process, or a process that is performed without deliberate or intelligent consideration for the particular facet or parameter.

One or more embodiments described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more embodiments described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some embodiments described herein can generally require the use of computing devices, including processing and memory resources. For example, one or more embodiments described herein may be implemented, in whole or in part, on computing devices such as servers, desktop computers, cellular or smartphones, tablets, wearable electronic devices, laptop computers, printers, digital picture frames, network equipment (e.g., routers) and tablet devices. Memory, processing, and network resources may all be used in connection with the establishment, use, or performance of any embodiment described herein (including with the performance of any method or with the implementation of any system).

Furthermore, one or more embodiments described herein may be implemented through the use of instructions that are executable by one or more processors. These instructions may be carried on a computer-readable medium. Machines shown or described with figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, embodiments may be implemented in the form of computer-programs, or a computer usable carrier medium capable of carrying such a program.

System Description

FIG. 1 illustrates a network-based communication system for providing application services to end users, according to one or more embodiments. In examples, a communication system 100 such as described by FIG. 1 is implemented on a server, combination of servers, or distributed set of computing devices which communicate over one or more networks such as the Internet. The communication system 100 can be implemented to provide project-based application services for a given group of users. As an addition or alternative, the communication system 100 can be implemented to provide application services for categorical designations of the user (e.g., personal use, family use). Thus, the categorical designations may not necessarily be project-based, but may utilize concepts as described for purpose of enabling the user to view and access external and internal tools used with use activities of the categorical designation.

Each user in the group can be associated with an individual account and/or a group account. By way of example, communication system 100 can be implemented to facilitate collaboration, project management, and team communication amongst users and/or a group of users. Further, the communication system 100 can be implemented in context of facilitating management of users of an enterprise, teacher and students of a classroom, and/or collaborators of a particular projects.

In examples, communication system 100 includes an application layer 110, a program interface layer 120, and a presentation layer 130. The application layer 110 includes application services that include project management services t for user and group accounts. The presentation layer 130 include user-facing components for rendering content and enabling user interactivity. The program interface layer 120 includes mid-tier processes and resources that interface the application services with the components of the presentation layer 130.

Presentation Layer

The presentation layer 130 includes processes that provide a user-interface component 132 for computing devices of end users. Each user of the communication system 100 can interact with the user-interface component 132 that is provided on their respective computing device to receive functionality provided with the application services.

In some examples, the user-interface component 132 is implemented as a session-based component that executes on a browser component of the computing device. In such implementations, the presentation layer 130 can include processes that communicate instructions to a browser component of the computing device, to cause the computing device to implement the user-interface component 132, and further to render current content views for that user's account. In such implementations, the presentation layer 130 includes processes to (i) communicate with the computing device of individual users to receive login credentials; (ii) match credentials to one or more existing accounts; (iii) retrieve current content data and account-specific configurations for the user-interface component 132; and (iv) implement the user-interface component 132 to enable the user to access and use the resource collection of individual projects that are associated with the corresponding user. In examples, the user-interface component 132 includes up-to-date content views for individual users, in accordance with account-specific configurations of the user or associated group.

Alternatively, the user-interface component 132 can be implemented as an application that runs on the computing device of individual users. For example, the user-interface component 132 can be implemented as a desktop application or mobile application. In such examples, the presentation layer 130 implements processes to communicate and update the user-interface component 132 on the computing devices of the individual users. In some examples, the user-interface component 132 can include a local version of the application data store 138 that is updated with application content and/or account-specific configurations when the application is open, and/or when background processes of the application are running on the computing device of the respective user.

Application Layer

The application layer 110 includes core application components, including communication components, such as messaging service 102, voice and/or video calling (represented in FIG. 1 by VOIP service 104), and/or audio/video conferencing service 106. In addition to the core application components, communication system 100 provides additional application services 108 to provide functionality that supplement or extend the functionality of the core application services. The communication system 100 can be implemented to enable users to select which application services are provided with individual projects. For example, by default, core application services can be provided for each project, and users can select one or more additional application services 108 from a library of application services 108 for use with individual projects. In some examples, the additional application services 108 are implemented as plugins of the core application component(s). A user or group administrator can select one or more application services (e.g., plugins, tools and other resources) from an application library, where the application service corresponds to a set of program instructions that are executed to enhance the functionality of the core application components. In the case of a group account, when an application service or other tool is selected, the application service becomes available to each user that is a member of the project. Depending on implementation, each member can be selected (e.g., receive invitation from another group member) or be added by default, based on, for example, settings of the respective group account. Such application services 108 (e.g., plugins) can facilitate project management, collaboration, organization, planning, and various other types of functionality, as well as application services and resources for user-defined categories of user activity. Specific examples of such application services 108 include (i) a daily updater plugin, where individual users of a project maintain a daily journal as to the specific tasks which the user undertook and/or completed; (ii) a to-do list application for tasks that individual users or groups of users are to perform; (iii) a checklist application to provide a checklist for activities or projects; (iv) a dashboard to display various forms of data associated with or used by a project, such as links to external resources that may be used by individuals of a group; (v) an invoice application; and/or (vi) a file management application to facilitate access and management of documents and resources.

In implementation, messaging service 102 can, for example, receive an incoming message from a given sender, locate the recipient of the message using the data store 116, and deliver the message in real-time to the user-interface component 132 provided on the recipient's computer. For example, the messaging service 102 can be used to create chat threads between two or more users of a given project. The VOIP service 104 can receive an incoming call connection request from a caller, identify information for locating the recipient for the call connection from the data store 116, and initiate a process to form a socket connection with the intended recipient, to enable subsequent and direct exchange of audio/video data between the caller and recipient. Likewise, the audio/video conferencing service 106 can receive incoming connection requests, perform authentication/validation (e.g., have users enter a pass-code), and connect the callers to a virtual room. Still further, in some variations, the application services can enable users to utilize augmented-reality (AR) or virtual reality (VR) hardware (e.g., headsets) to communicate or share environments with other users through the communication system 100. The application components can be implemented through a library of microservices, where the microservices perform programmatic task to implement the functionality of an application component.

Service Data Store

As described, embodiments provide for communication system 100 to enable users to create and participate in projects, where individual projects are implemented with user-specified attributes that identify project members, roles of individual members within the project, application services that are utilized by the project, project settings, and/or other aspects that affect how the project is implemented. For example, a user can create a new project through interaction with a user-interface component 132. At the time the user creates the project, the user can specify attributes such as project members, the roles of each project member (e.g., administrator, read-write access, read-only access, etc.), and the application service(s) that the project is to use. The attributes of the project can be changed over time, such as by the project creator (or administrator) or other project user, depending on implementation. Further, project members can perform project-specific activities, by, for example, utilizing the application services and project resource collection in accordance with the attributes that define how the project is to be implemented.

The communication system 100 maintains one or more data stores (represented by service data store 116) that associates projects with their respective attributes. In implementation, the service data store 116 can be implemented by one or more tables, databases or other relational data structures. In examples, the communication system 100 generates a unique project identifier for newly created projects. The data store 116 associates each project identifier with user and/or group accounts, reflecting the user that created the project as well as users that are assigned to the project, either initially or over time. The data store 116 can also specify which application services 102, 104, 106, 108 are available for use with the corresponding project. In some implementations, users (e.g., the creator or administrator-level user of the project) can select one or more of the application services that are available to the users of the project. For example, users can select which additional or supplemental application services 108 are available to users. Further, the data store 116 can associate each project identifier with identifiers of application instances that are used by the project members, where each application instance corresponds to execution of a corresponding application service using project specific parameters and inputs. In context of examples, an instance of the messaging service 102 can correspond to a chat thread between two or more members of a project, and the identifier of the instance can uniquely identify the specific chat thread from a collection of chat threads that may involve the same or different users.

In examples, the service data store 116 can also associate each project identifier with a corresponding project resource collection. The project resource collection can include folders, files, data sets, third-party interfaces, and other resources that users associate with projects over time. In some implementations, the service data store 116 references individual project identifiers with a corresponding directory location where files that are associated with the respective project are located. Still further, the project identifier can also reference links (e.g., URLs) or other programmatic references to third-party or external resources, where, for example, data and other resources of the project are maintained.

Still further, the service data store 116 can associate project settings with corresponding project identifiers. In some implementations, project settings are specified by a project creator, or other project user who has such permissions. As an addition or variation, project settings can be programmatically determined. For example, the communication system 100 can include processes that monitor user interactions with notifications to determine settings for the location where notifications are rendered for individual projects.

As an addition or variation, service data store 116 separately associates user accounts with project identifiers. For example, the service data store 116 can include a separate table that associates each user's account with the project identifier of every project for which the user is a member or owner of. In some implementations, the service data store 116 can identify a user's role or permission with respect to individual project identifiers. For example, the user's role can be creator (e.g., administrative access, select application services or members for project identifier), member (e.g., access and use application services associated with project identifier, edit files) or viewer (e.g., read-only access, etc.). Accordingly, when a given user logs on or initiates a session with communication system 100, the user-interface component 132 that operates on the user's computing device provides the user with access to the user's projects. Further, the service data store 116 can specify the user's role or permissions for each project, such that the user's access to the respective project's resource collection (e.g., files, data sets) is based on a policy defined for the user's role or permission.

For each user, the service data store 116 can also store user profile information in association with corresponding user accounts. In examples, profile information can be obtained through an onboarding process for individual and/or group accounts, such as may be conducted through the user-interface component 132 and/or other interface (e.g., web-interface). The user profile information can also include usage information, corresponding to historical information reflecting how the individual user utilized the communication system 100. For example, the historical information can include parametric information that identifies the manner and extent to which the user interacted or used resources of individual projects, as well as the user's behavioral patterns with regards to receiving, reading and/or responding to notifications. Further, the profile information maintained with the service data store 116 can be updated by users through their respective interactions with the communication system 100, such as through the user-interface component 132. For example, a user can specify settings, preferences and other information (collectively, "customizations") for customizing operation of the application service that are used with a project that the user creates. For individual accounts, the customizations can configure a project's resource collection, as well as the manner in which the user interacts with the associated application services and project resources. For example, the customizations can configure content views and/or the manner in which notifications from different application services are provided to the user.

In some variations, communication system 100 implements processes to learn the customizations for specific users and/or groups, such as through use of machine-learning algorithms that monitor usage of the application services by individual user accounts and group accounts. In such examples, the communication system 100 configures operations for the user-interface component 132 and/or other processes of the communication system 100, based on parameters, weights and other data that are learned from monitoring the usage of the application services by individual users.

In some examples, the communication system 100 implements policies, such as by default, where users are only given access to application services and resources of projects that the respective users are associated with. In this way, the communication system 100 limits access to project data to only those users who are members of the project. Further, in some variations, the communication system 100 can also implement policies (e.g., permissions) to separately control, for example, the type of access individual users may have to project files and data. Thus, in such variations, while users may be given access to project resources (e.g., files, data sets), the access can be further curtailed or controlled through implementation of access policies that can be configured on a project-by-project basis.

When a user logs on or otherwise initiates a session with the communication system 100, the service data store 116 can further be updated to reflect information for locating the device over one or more networks. As described in greater detail, the user account can link to project identifiers associated with the user, each of which can further link to application service identifiers (via the application data store 138). The user-interface component 132 can then load content views, notifications and other content based on the current application data sets associated with each application service identifier.

Program Interface Layer and Application Data Store

Additionally, the program interface layer 120 can include processes to maintain job queue(s) for user or group accounts, schedule tasks, and manage workflow amongst the various processes that constitute the application components. The processes of the program interface layer 120 can also allocate resources for user or group accounts as needed. In some implementations, the program interface layer 120 allocates resources for implementing the various application instances used by the population of users. For example, the program interface layer 120 can designate server resources of projects and/or communication channels, such that the projects and resources can have a dedicated set of available resources.

Still further, the program interface layer 120 can implement operations to enable a persistent communication link to be formed between individual computing devices and a select application service. In examples, the program interface layer 120 can enable a direct connection to be formed between, for example, the VOIP application 106 and the computing device of the user, such that the end user of the computing device can participate in a one-to-one video call with another user, or with a group chat. In such cases, each end user can operate a respective computing device to establish a direct connection with the application service 108 to enable live interactive communication.

In examples, the service manager 122 maintains an application data store 138 that stores the current application data sets for the instance of application services that are used with each project identifier. The application data store 138 can be maintained by one or more processes (represented by service manager 122) of the program interface layer 120. In examples, the application data store 138 associates individual project identifiers with (i) corresponding identifiers of instances of the application services used by the respective projects, and (ii) current application data sets for each of the identified application service instances. In some variations, the application data store 138 also associates project resources (e.g., files, data sets, directories, folders, etc.) with the respective project identifiers. The service manager 122 executes to monitor application activity for each of the identified instances. In this way, the service manager 122 maintains, for each application service instance, the current state of each application service instance.

In examples, the application data store 138 is maintained on the network (e.g., "server-side"), and current application data sets are pushed/transmitted to user-interface components 132 when users initiate a session or logon. In variations, some or all of portions of the application data store 138 can be loaded locally on the computing devices of respective users. For example, the presentation layer 130 can cause a copy of the application data store 138 (or user-relevant portion thereof) to be stored locally and/or updated for the user's session. In this way, the user-interface component 132 may retrieve local application data to display the content views and other data sets of the respective project.

The service manager 122 also updates the application data store 138 to reflect activities that are performed by the user (e.g., user sends or receives a message using messaging application service 102) or by other users (e.g., user is member of a communication channel where messages are exchanged independent of the user's activity). In examples, the service manager 122 maintains, within the application data store 138, a data representation of the current content rendered by an instance of the application service. Further, the service manager 122 can determine a difference data set between the current application data set and prior application data sets, such that the difference set is used to update the respective application content views when the corresponding projects are accessed by end users. In this way, service manager 122 maintain application data store 138 so that current application data is maintained for each user of the group.

Notification Engine

According to examples, the program interface layer 120 includes a notification engine 124 that executes processes to monitor individual application services for notifications. The application services 102, 104, 106, 108 (or associated processes) can execute to generate notifications that are targeted for one or more user accounts. The notification engine 124 operates to maintain a notification data store 125 that maintains notifications generated for users of the communication system 100. In examples, the notification data store 125 associates individual notifications with (i) one or more user accounts, where the user account(s) represents target recipient(s) of the respective notifications; and (ii) a project identifier that is associated with the application instance from which the respective notification was generated. The notification engine 124 can cause delivery of the notifications to intended recipients. The notification engine 124 can continuously monitor the application services of the application layer 110, to associate individual notifications with one or more accounts and projects. Further, the notification engine 124 generates, for individual user accounts, an aggregated set of notifications generated by different application services of the respective user's projects. Accordingly, each notification of the generated set is associated with an instance of an application service, a project identifier, and a user account. The aggregated set of notifications can be communicated to the user for consumption. In some examples, the notification engine 124 periodically or repeatedly transmits, via the external interface 126, the aggregated set of notifications to an external program or device. For example, the notification engine 124 can include external interfaces for enabling the aggregated set of notifications to be sent to individual users via a third-party messaging program (e.g., via email protocol to email address of user; as text message, etc.). In examples, aspects of the notification engine 124 can be distributed onto user devices, and the external interface 126 can include processes that execute locally on such devices to cause the user device to render content, representing the aggregated set of notifications, on an external resource of the user's device (e.g., display notifications in notification bar or window of user device). In such examples, the notification bar or window may be generated or provided through the operating system of the end user device.

In some examples, the notification engine 124 can communicate with processes of the presentation layer 130 to cause notifications generated by different application services to be rendered in aggregate as content views of the user-interface. In this way, examples provide for the user-interface component 132 to render notifications to one or more target content views, where the target content views include (i) one or more application-specific content views, where each application content view displays content reflecting notifications generated from a corresponding application service (e.g., in chronological fashion), along with other types of application content; (ii) a project-specific notification aggregation view, in which notifications are generated by application services of different types for the specific project (those notifications associated with the respective project identifier), and/or (iii) a content notification view that displays an aggregation of notifications generated by different application services and/or through different projects for which an individual user is linked to. The presentation layer 130 can further implement the user-interface component 132 to make the determination of the target content view of individual notifications based on a variety of factors, such as (i) parameters related to the individual notifications, such as parameters related to the source application service or the content of the notification, (ii) preferences or settings of the end users, and/or (iii) learned usage of the end users with respect to notifications.

User-Interface Component

For a given user, examples provide for the user-interface component 132 to render any one of multiple possible content views, where each content view corresponds to application data generated by at least one application service of a corresponding project of the user. As illustrated with FIG. 3A through FIG. 3C, for example, the user-interface component 132 can generate a user-interface 300 (see FIG. 3A through FIG. 3C) that provides multiple content views, organized in accordance with a project-based schema. Additionally, the user-interface component 132 can enable users to interact with notifications. The interactions can include input that is indicative of the user reading, discarding, or responding to the notification. In some variations, the user can perform other types of programmatic actions by interacting with notifications. The user's interaction (or non-interaction) with individual notifications can be recorded in the notification data store 125. In some examples, the notification engine 124 can implement learning processes to determine the type, content or context under which individual users receive, process or take responsive action to notifications. Through learning algorithms or other intelligent processes, the notification engine 124 can tune the targeting of notifications to particular content views the user-interface components 132 for different users. For example, notifications which are determined to be important to the user can be targeted to a notification aggregation view. The selection of such notifications can be made through, for example, an intelligent learning process.

Usage Monitoring and Notifications

In examples, presentations layer 130 includes processes (represented by usage monitor 158) that monitor the interactions between users and notifications. The usage monitor 158 records usage data reflecting individual user's interactions. By way of example, the parametric data reflecting notification type, duration between when the notification was received and when the user interacted with the notification, contextual information (e.g., time or day when notification was received), information about the project (e.g., number of members, age of project, etc.), information about the account that received the notification (e.g., age of user account), and/or the type of action that user performed with respect to the notification (e.g., dismissed the notification, replied to the notification, forwarded the notification, viewed the notification, ignored the notification, etc.).

In examples, the usage data can be processed (e.g., further parameterized, vectorized, etc.) and stored with the service data store 116 as profile information for the particular user account. In this way, the usage data can reflect historical information regarding how the user interacted with notifications.

Further, in some examples, the profile information stored with individual users can reflect categorical information about the user. For example, the profile information can reflect the type of role the user may have with respect to projects (e.g., managerial or supervisory role) the experience level of the user, the type of industry the user is in (in which the projects that the user is member of relate to) and other types of information from which perspectives or insight can be inferred regarding how the user wishes to receive and handle notifications.

The communication system 100 can include a usage analysis component 144 that analyzes user profile information 155 in order to generate predictive logic 165 that is determinative of how notifications for end users should be targeted, specifically as to the particular content view(s) or presentations where the individual notifications are to be rendered. The predictive determinations can reflect a likelihood of a response type from the user, such as for example, a likelihood of whether the user will (i) view the notification, (ii) ignore the notification, (iii) dismiss the notification without taking action, and/or (iv) take action in response to the notification. In some variations, the predictive determinations can also specify a pre-formulated response action which the user will likely want to take (e.g., respond and dismiss, respond with pre-formulated message, forward notification, delete notification, set reminder, etc.).

In variations, the predictive logic 165 can be implemented by, for example, notification engine 124, the user-interface component 132 and/or other processes of communication system. The predictive logic 165 can utilize one or more attributes of individual notifications (e.g., application type that generated the notification, keywords or content of the notification) to determine the handling of individual notifications, including (i) a target content view or interface for the notification, and/or (ii) a response type that is to be provided with the notification, to automate one or more actions the user would likely take in response to viewing the notification. In some implementations, the predictive logic 165 is rule-based. For example, the predictive logic 165 can include a rule set that references programmatic actions that are to be taken by the user-interface component 132 in connection with rendering the notification and/or facilitating likely response actions from the user, where the rules are selected and/or otherwise configured by attributes of the notification, contextual information and/or other parameters. As an addition or variation, the predictive logic 165 can include one or more models which numerically score individual notifications as to likely target content view or interface and/or response actions from the user.

In some examples, the predictive logic 165 is stored with the user-interface component 132. For example, the predictive logic 165 can be stored on the user computing device and/or on a server of the communication system 100. The predictive logic 165 can include rules and models, as well as a set of references that identify one or more programmatic actions that are to be taken by the user-interface component 132 in response to a given notification, based at least in part on the attributes of the respective notification. As an addition or variation, the predictive logic 165 can be implemented by the notification engine 124, such as in connection with a determination of whether individual notifications are to be included in an aggregated set of notifications that are to be transmitted to an external resource via the external interface 126.

In some examples, the predictive logic 165 can be implemented to make determinations as to whether individual notifications should be targeted to the global notification aggregation view of the user-interface, where notifications for different projects and types of application services are rendered. The usage analysis component 144 can, for example, score individual notifications for weight, rank, or prioritization, with notifications having higher scores being reserved for the global notification aggregation view. The notification engine 124 can target notifications to particular content views, or alternatively, to external resources (via the external interface 126) based on the determination (e.g., score) made for the individual notification. In this way, the global notification aggregation view can provide an initial or primary location of user attention, thereby simplifying user experience. In implementation, the predictive logic 165 can target notifications generated for the user to the global notification aggregation view when, for example, the notification's score exceeds a predetermined threshold or relative threshold (e.g., highest scoring notifications in a time interval (e.g., 15-minutes)).

Methodology

Figure 2A:
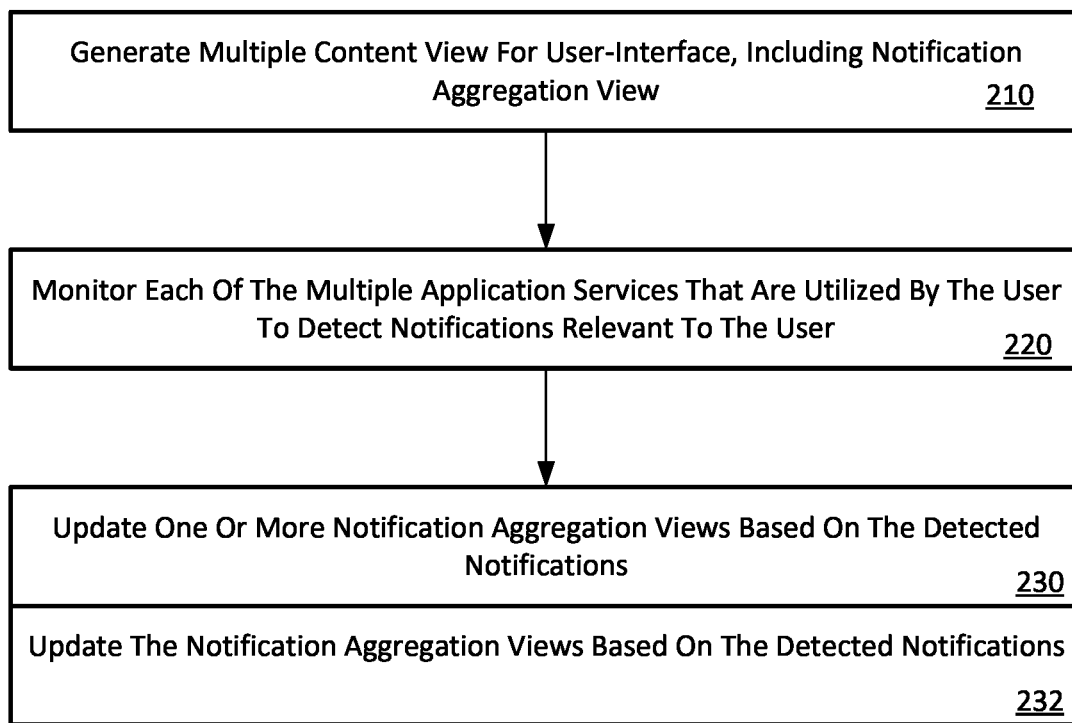
FIG. 2A describes an example method for providing notifications generated for multiple application services to a group of users, according to one or more embodiments.

FIG. 2A describes an example method for providing notifications generated for multiple application services to a group of users, according to one or more embodiments. FIG.

2B describes an example method for providing notifications generated for multiple application services to a group of users, according to one or more embodiments. Example methods such as described with FIG. 2A and FIG. 2B may be implemented using a communication system such as described with an example of FIG. 1. Accordingly, reference may be made to elements of FIG. 1 for purpose of illustrating components and functionality that are suitable for performing a step or sub-step being described.

With reference to FIG. 2A, the communication system 100 generates, for each user of the group, a user-interface on which multiple content views are displayed (210). Each of the multiple content views includes application content generated by at least one of the multiple application services. Further, the multiple content views include a notification aggregation view that includes content based on notifications generated by different application services.

The communication system 100 monitors each of the multiple application services that are utilized by the user to detect notifications that are relevant to the user (220). For example, the communication system 100 can monitor core communication services of the communication system, as well as notifications generated by plugin or other application services.

In examples, the communication system updates one or more notification aggregation content sets based on the detected notifications (230). In examples, a notification aggregation content set can include notifications from multiple projects that the user is associated with. Thus, the notification aggregation content set can include content that is based on notifications generated by different application services, and in connection with different projects of the user. As an addition or variation, the notification aggregation content set includes content generated by different application services for a specific project of the user. Still further, the communication system 100 can also cause individual notifications to be rendered on a content view that is specific to a particular tool or application service that generated the notification.

In some examples, the communication system 100 selectively determines which notifications are rendered on one or more of the content notification views of a user-interface (232). The determination can be based at least in part on attributes of individual notifications, such as attributes reflecting information about the application service that generated the notification, attributes relating to the context of the notification and/or attributes relating to the content of the notification (e.g., keywords).

In some examples, the communication system 100 analyzes historical information relating to the interaction of the user with notifications, rendered through one or more of the content views (e.g., through one or more notification aggregation views). Based on the analysis, the communication system 100 generates and tune models that are predictive of which notifications a given user will interact with, ignore, or interact with minimally. Accordingly, in some examples, the communication system 100 may deploy machine-learning models to determine which notifications are rendered in any one of the content notification views. The models may be based on historical usage of the user, a group of users, or a categorical designation of users (e.g., users or enterprise accounts in the same industry or roles).

Figure 2B:
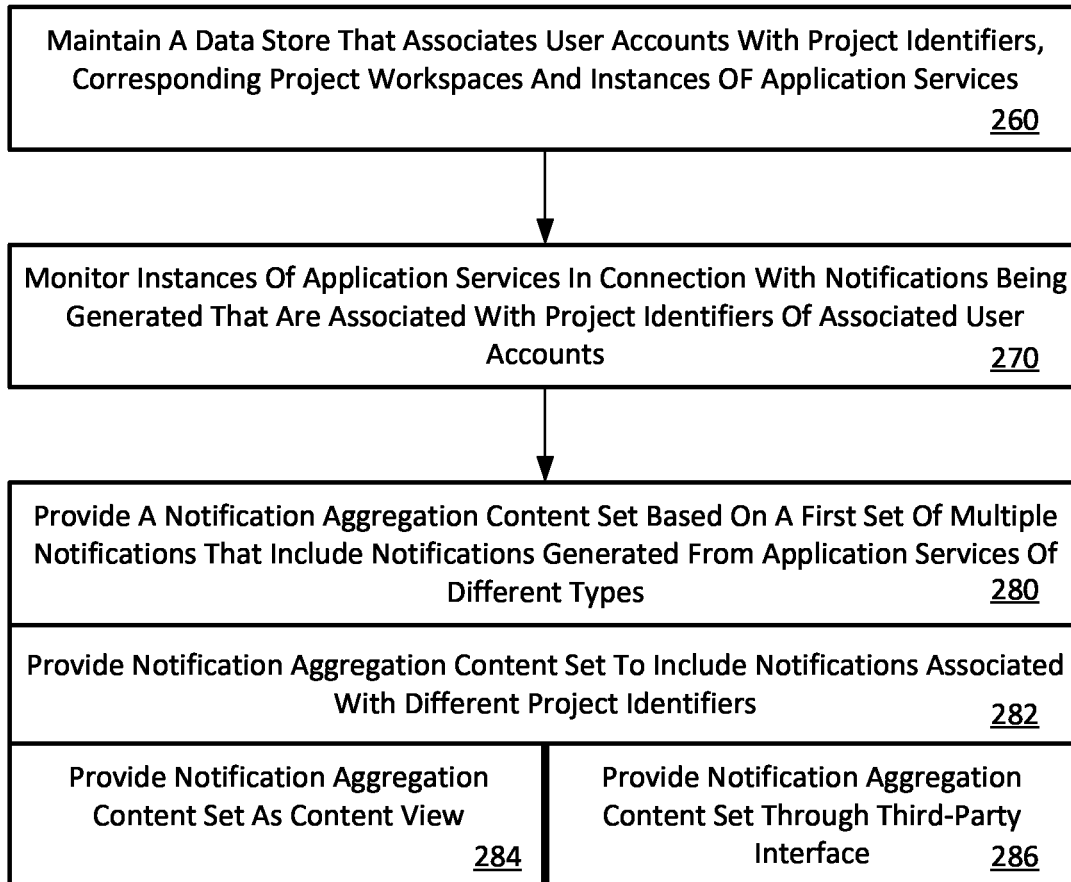
FIG. 2B describes an example method for providing notifications generated for multiple application services to a group of users, according to one or more embodiments.

With reference to FIG. 2B, the communication system 100 operates to maintain a data store that associates user accounts with project identifier, corresponding project resources and instances of application services (260). For example, communication system 100 maintains application data store 138, which associates each user account with one or more project identifiers. Each project identifier can identify files, data sets and other resources that are selected and made available for use with the particular project. In this way, multiple users (each with corresponding user accounts) can collectively access the resources of a corresponding project having a project identifier. Further, each user account can be associated with multiple project identifiers, reflecting that a given user works on different projects with different groups of users.

The communication system 100 monitors instances of application services in connection with notifications be generated for target user accounts (270). In examples, the generated notifications are associated with user accounts, reflecting, for example, the intended recipient of the notification. Further, the generated notifications or also associate with project identifiers, reflecting a particular project that is associated with the instance of the application service which generated the particular notification.

In examples, the communication system 100 provides, for individual user accounts, a notification aggregation content set that is based on a set of multiple notifications, including notifications generated from application services of different types (280). In this way, the notification aggregation content set enables individual users to view notifications generated by different instances of application services, including different types of application services, on a single interface and at one time.

As an addition or variation, examples provide for the communication system 100 to generate, for a given user account, the notification aggregation content set to include notifications that are associated with different project identifiers (282).

In some examples, notification aggregation content set enables rendering of content that is based on the multiple notifications on a given user-interface. As described with some examples, the notification aggregation content set can be generated as a content view for user-interface component 132 (284).

As another example or variation, the notification aggregation content set can be transmitted as, for example, a message (e.g., email, text message (e.g., SMS), etc.) or communicated to the end user (of the associate a user account) through a third-party application or service (286). Thus, for example, the user can view notifications generated for the user by different types of application services in an email, such as when the user is off-line from communication system 100.

Example User-Interface

Figure 3A:
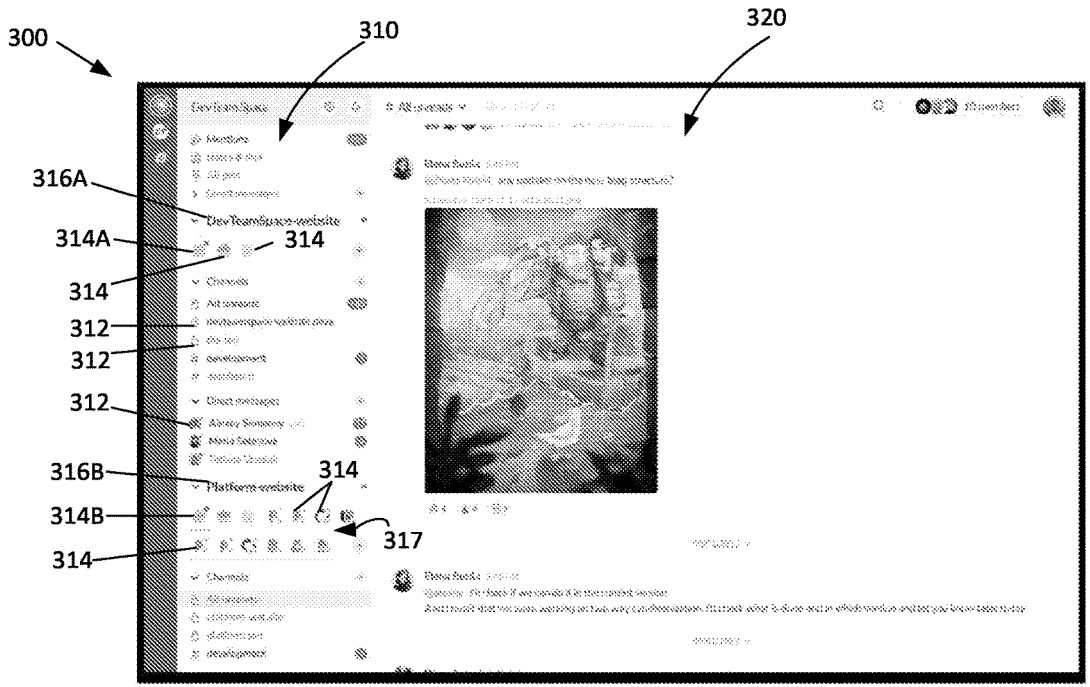
FIG. 3A through FIG. 3C illustrate examples of a user-interface that can be generated for users of a communication system such as described with an example of FIG. 1, according to one or more embodiments.
Figure 3B:
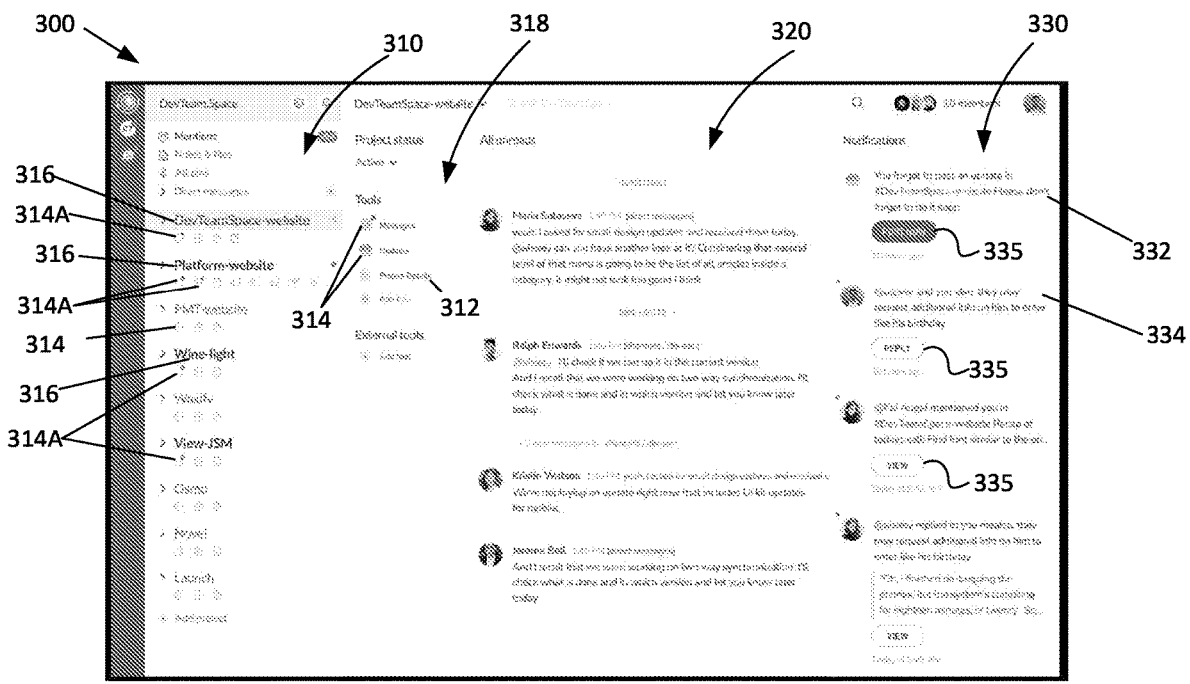
Figure 3C:
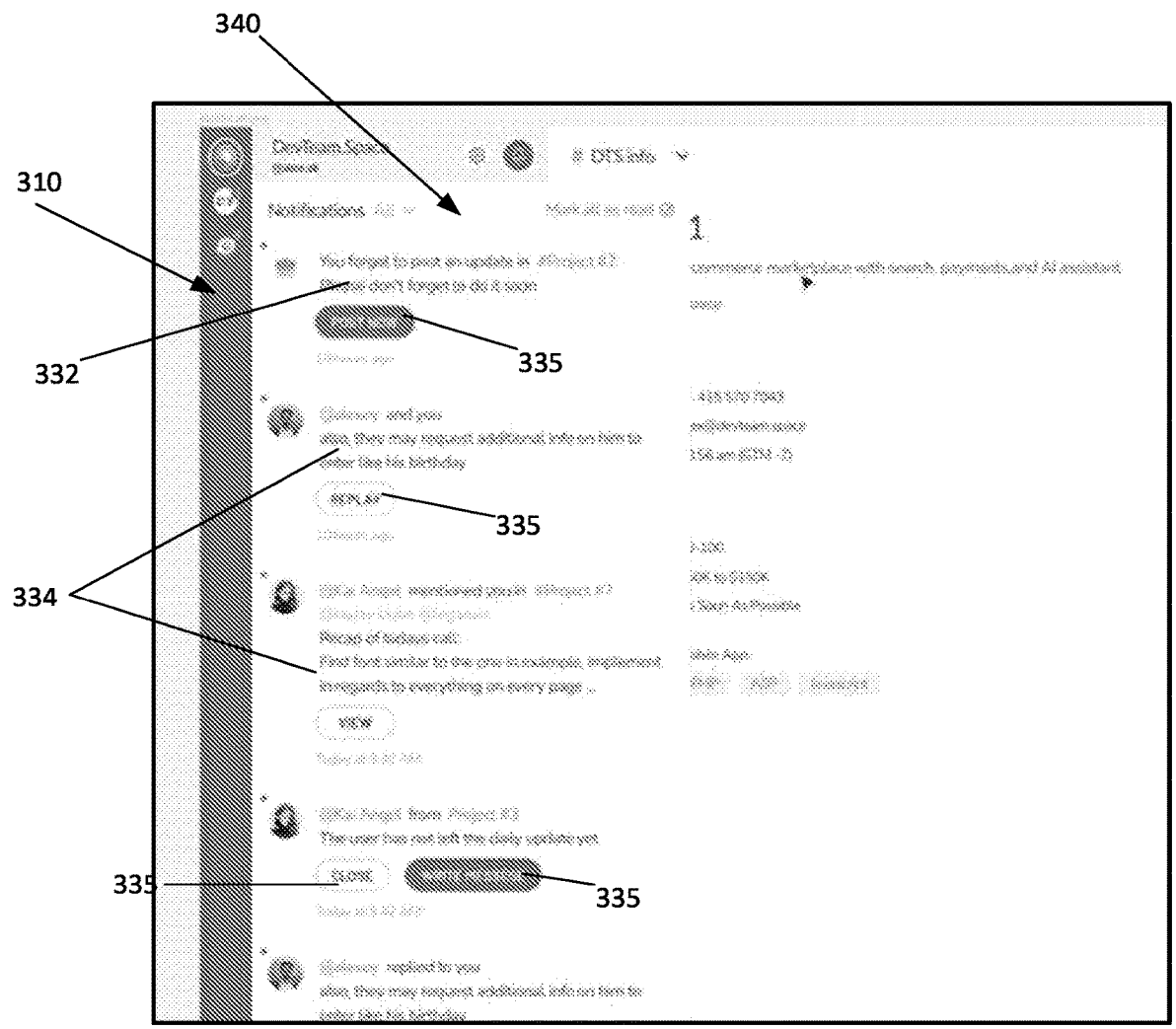

FIG. 3A through FIG. 3C illustrate examples of a user-interface that can be generated by a communication system such as described with an example of FIG. 1, according to one or more embodiments. With reference to FIG. 1, an example user-interface 300, as shown by FIG. 3A through FIG. 3C, is implement by user-interface component 132 on individual computing devices of the user.

With reference to FIG. 3A and FIG. 3B, the user-interface 300 is structured to include a control panel 310 and one or more content panels 320. The content panels 320 provide content views, where each content view is based on an output of one or more application services. Each content panel 320 refers to a window or frame which defines a region on which content views generated by one or more particular application service are generated and updated. In some variations, each application service can generate content view(s) for a separate content panel 320. Still further, a separate content panel may be provided for each instance of an application service. Depending on the application service type, the content view rendered on the content panels 320 can include updates (programmatic notifications of a particular event) or application-specific resources (e.g., connect call feature). Accordingly, the user-interface 300 can include multiple content panels 320, where each content panel renders content views of particular types (e.g., text, image, audio/video), based on the output of a corresponding application service. As shown by an example of FIG. 3B, the content panels 320 can include one or more notification content panels 330, where notification content views are rendered, based on aggregations of notifications from different application services for a selected project.

In variations, the content panel(s) 320 and/or notification content panels 330 can interact in different ways, based on implementation. For example, multiple content panels 320, 330 can be displayed at one time, where the interaction between the content panels 320, 330, and/or between the content panels 320, 330 and the control panel 310, is dynamically responsive to user input (e.g., content panels can move laterally or vertically with respect to one another, appear/disappear, fly over or under, hover, fade in and out, etc.). In examples, the content panel 320 can, at the selection of the user, change the content view that is being displayed or provided in prominence (e.g., in the forefront). The determination of which content panels 320, 330 to display in prominence can be based on a user selection or interaction with elements of the control panel 310, and/or determined by default or other interactive features. Further, the user may interact with the user-interface 300 to select alternative content views for display in the content panels 320, 330. As further described, at least some of the content views can be specific to individual projects.

In examples, users can assign or otherwise define resources to projects through user interaction with the user-interface 300. For example, a user (e.g., group admin user) can create one or more communication channels that are dedicated for specific projects. Additionally, in some examples, a user (e.g., group admin user) can assign application services (e.g., plugins, internal tools, external tools, etc.) for use with individual projects. As an addition or variation, the different instances of a plugin or other application service can be assigned to different projects. Still further, the user can assign resources that include files, directories or resources, and/or links to files, directories or resources. In this way, the user can specify application resources (e.g., plugins, tools) that are to be used for individual projects. Thus, the tools that a given user associates with one project can be different than the tools the user associates with a different project.

Control Panel

In examples, the control panel 310 provides an interactive framework for the user-interface component 132. The control panel 310 can include interactive nodal elements, where each nodal element represents an input interface for a corresponding programmatic trigger. As described, a user interaction with respect to a nodal element can trigger the performance of one or more operations to affect the configuration and/or content of the control panel 310 and/or content panels 320, 330. Further, each nodal element can include a visual element that is representative of a function performed with selection of the element. Additionally, at least some types of nodal elements can be associated with a status, which can be indicated visually through the respective nodal element.

In some examples, the control panel 310 provides interactive nodal elements that receive user input, and the user-interface 300 responsively implements operations that include (i) changing the viewing or configuration mode of the control panel 310, (ii) selecting and triggering the rendering of content views for one or more content panels 320, 330, and/or (iii) determining a layout for the one or more content panels 320, 330. Further, in embodiments, at the control panel 310 can be structured to organize at least some of its functional elements in accordance with a project-based schema.

In examples, a project-based schema, as implemented by control panel 310, includes an arrangement of primary nodal elements 316 to represent projects, with each primary nodal element 316 being logically linked to sub-nodal elements 312, 314 that represent resources of the respective project. The relationship between the primary nodal element 316 and the sub-nodal elements 312, 314 may be hierarchical. Each primary nodal element 316 can include an identifier of a corresponding project. For example, each primary nodal element 316 can be textual and selectable. When a primary nodal element 316 is selected, the nodal element 316 can expand, collapse, or partially collapse. Additionally, the selection of a primary nodal element 316 can trigger a corresponding set of content views to be displayed in one or more content panels 320.

In examples, the control panel 310 implements a schema that visually and logically associates individual projects with resources that are specific to that project. In particular, the nodal elements of the control panel 310 (e.g., which can be represented as textual items) can be organized so that each primary nodal element 316 corresponds to a project, and the sub-nodal elements 312, 314 of each primary nodal element 316 provide resources, including internal and external tools that are selected for the respective project. In implementation, an internal tool can correspond to an instance of an application service, such as a supplemental application service or plugin. An external tool can correspond to, for example, a link (e.g., URL, deep link, etc.) that is selectable to open, for example, an internal or external tool (e.g., online document or file provided by a third-party). In some implementations, the selection of a sub-nodal element 312, 314 or primary nodal element 316 may result in one or more content panels 320, 330 that display corresponding contents views. For example, in FIG. 3A, the selection of a sub-nodal element 314 results in the content panel 320 displaying content from an internal tool, such as an instance of one of the application services 102, 104, 106, 108. Accordingly, in some implementations, selection input or other user interaction received by sub-nodal element 312, 314 can cause a corresponding content panel 320, 330 to display or update a content view that is generated by the represented tool.

According to some examples, the control panel 310 implements a schema that includes prioritized nodal elements 314, positioned in prominence with respect to the corresponding primary nodal element 316. In examples, the prioritized nodal elements 314 can be positioned just underneath and in relative closest proximity to the respective primary nodal element 316. As an addition or variation, prioritized nodal elements 314 can be arranged to extend horizontally and/or row-wise so as to be provided in multiple rows. In this way, users can designate priority to individual resources of a project by selecting to pin the respective nodal element in proximity to the primary nodal element 316. By contrast, the sub-nodal elements 312 can represent additional resources (e.g., internal tools, such as message threads, communication channels, instances of application services, etc.) that are associated with respective projects. Each sub-nodal element 312 is responsive to user input to generate or update content generated by, for example, a corresponding application service.

In examples, each primary nodal elements 316 can be manipulated by user input to transition (i) from a collapsed state to an expanded state on the control panel 310, and (ii) from an expanded state to a collapsed (or non-expanded state) on the control panel 310. As an addition or variation, each primary nodal element 316 can be expanded or collapsed to one or more intermediate non-expanded states. The states (expanded, collapsed or intermediate(s)) represent the extent to which sub-nodal elements 312, 314 of the respective primary nodal element 316 are visible.

According to some examples, the control panel 310 provides for the primary nodal elements 316 to be displayable in a collapsed or non-expanded state, where some, but not all, of the sub-nodal elements 312, 314 are visible to receive user input and/or indicate a status or state of the represented tool. In variations, each primary nodal element 316 can be placed into a partially collapsed state where at least some of the prioritized sub-nodal elements 314 are visible. In some examples, only prioritized sub-nodal elements 314 (as selected by the user) are visible when the primary nodal element is in a collapsed or non-expanded state.

In a variation, no sub-nodal elements 312, 314 are visible when the primary nodal element 316 is in a fully collapsed state, and prioritized sub-nodal elements 314 are visible when the primary nodal element is in an intermediate non-expanded state. Conversely, when the primary nodal element 316 is in the expanded state, the sub-nodal elements 312, 314 are visible on the control panel 310, in association with the primary nodal element 316.

In an example of FIG. 3A, the primary nodal element 316A is shown in an expanded state, while the primary nodal elements 316B are in a collapsed or contracted state. As shown by an example of FIG. 3A, the amount of area that is dedicated for a given project can vary based on whether the corresponding primary nodal element 316 is in a collapsed or expanded state. In the expanded state, the sub-nodal elements 312 of the primary nodal elements 316A are arranged vertically and made visible on the control panel 310. The sub-nodal elements 314 are positioned in proximity to the primary nodal element 316A, and arranged to extend horizontally and/in rows so that some or all of the prioritized sub-nodal elements are visible with the primary nodal element 316A. Furthermore, the positioning of the sub-nodal elements 314 can be selected by the user to reflect, for example, a priority of the particular resource for the respective project. When the primary nodal element 316 is in the expanded state, the user can interact with either (i) the sub-nodal elements 312, which may be vertically-arranged relative to the primary nodal element 316A, or (ii) the sub-nodal elements 314, which are prioritized and arranged to extend horizontally or row-wise with respect to the primary nodal element 316A. Interaction with sub-nodal elements 312, 314 causes the content panel 320 to display a corresponding content view generated by a tool or resource represented by the selected sub-nodal element 312, 314. Further, the selected sub-nodal elements 312, 314 can each provide a status indicator that represents whether the content view for the resource represented by that sub-nodal element 314 has been updated or previously viewed by the user. By allowing prioritized sub-nodal elements 314 to extend horizontally or row-wise, the control panel 310 can also be optimized for devices with smaller screen size. For example, users of mobile devices can view prioritized sub-nodal elements 314 with their respective status indicators, and further take responsive action without performing actions such as expanding the corresponding primary nodal element 316. In this way, the user-interface 300 can minimize the amount of display area which is dedicated for a given primary nodal element 316, while at the same time enabling users to interact with prioritized sub-nodal elements 314 of the primary nodal elements 316.

With further reference to FIG. 3A, the primary nodal element 316B is shown in a collapsed or non-expanded state, where only prioritized sub-nodal elements 314 of the respective project are visible. In this state, other sub-nodal elements 312 of the project are hidden on the control panel 310. As shown, the prioritized nodal elements 314 extend horizontally or row-wise in proximity to the primary nodal element 316B. For example, the prioritized nodal elements 314 can be provided in a bar region 317, provided under or adjacent to the primary nodal element, where prioritized nodal elements 314 can be arranged. In some implementations, one or more dimensions (i.e., length, width) of the bar region 317 are dynamic, such that the bar region 317 is sized to accommodate a selected number of prioritized sub-nodal elements 314. For example, the vertical dimension of the bar region 317 can be determined by the number of rows of prioritized sub-nodal elements 314, as well as the relative dimension of the control panel 310, which can vary based on settings and/or hardware/software configurations (e.g., display size). The user can select which nodal elements 314 are selected to be prioritized, as well as the sequence or positioning of the prioritized nodal element 314 relative to other prioritized elements of the primary nodal element 316B.

In examples, the user can interact directly with prioritized sub-nodal elements 314, while the corresponding primary nodal element 316B is in an expanded state, to cause the content panel 320 to display a content view generated or corresponding to the selected prioritized sub-nodal element 314. Further, in the collapsed state, individual sub-nodal elements 314 can each include a status indicator that represents, for example, whether the content view for the resource represented by the selected sub-nodal element 314 has been updated or viewed by the user as compared to a prior instance.

As shown by FIG. 3B, the primary sub-nodal elements 316 of the control panel 310 are shown in a collapsed or non-expanded state. The user can scroll the control panel 310 to select prioritized sub-nodal elements associated with each primary nodal element 316, without any of the primary nodal elements being in an expanded state. Further, the user can view status indicators provided with prioritized sub-nodal elements 314, where the indicators are generated by the tool or resource represented by the corresponding sub-nodal element 314. Accordingly, in examples, a user can scroll through the control panel 310 to view the status indicators of prioritized sub-nodal elements 314 of corresponding primary nodal elements 316, where alerted prioritized sub-nodal elements 314A can reflect those tools or resources where new events, content or notifications exist relative to a prior instance where the user viewed content from that tool or resource. The user can then interact with, for example, an alerted prioritized sub-nodal element 314A to view new notifications and/or content provided through the represented tools or resources. As illustrated by such example, the user can scroll through the control panel 310 to identify a point of action (e.g., an alerted tool or resource), where the user should focus his or her attention. The user can select the alerted tool or resource, in order to, for example, view/act on a notification or event generated through the alerted tool or resource. In this way, the user can manage numerous projects and arrive at a point of action (e.g., a notification or event that requires the user attention) through scrolling and/or one or two clicks. Further, in some cases, the user can interact or provide input as a response to the notification or event generated by the alerted tool or resource, where the interaction can be in the form of a shortcut or automated/programmatic action.

In examples such as shown with FIG. 3B, the selection of a given primary nodal element 316 can cause a project status panel 318 to be displayed. The project status panel 318 can provide alternative arrangements of some or all of the sub-nodal elements 314 for the respective project. Further, the user can interact with features of the project status panel to, for example, add resources such as additional internal or external tools.

Content Notification and Aggregation

With further reference to an example of FIG. 3B, the selection of the primary nodal element 316 results in the notification content panel 330 being made visible, to provide a notification content view. In one implementation, the notification content view includes an aggregation of notifications, generated by instances of application services that are associated with the project of the selected primary nodal element 316. For example, the notification engine 124 can target notifications generated by multiple application services for one or more content views, such as for the notification content panel 330. Accordingly, the content notification panel 330 can provide content that corresponds to an aggregation of notifications of different types (e.g., generated by different types of application services). The aggregation can be in the form of a list, displayed chronology. In an example shown by FIG. 3B, the content notification panel 330 includes an application notification 332 (e.g., daily update plugin that prompts a user to provide a status on a task or assignment), and one or more messaging notifications 334. In some examples, the notification content panel 330 can also render individual notifications with a corresponding response feature 335. Each response feature 335 enables the user to initiate and/or perform an operation (e.g., reply, view an attachment, compose a message, open a plugin or other application service, etc.). In this way, the user-interface component 132 displays one or more aggregations of notifications, generated by different application services that are utilized by the respective project.

With reference to an example of FIG. 3C, the user-interface 300 can also provide a content notification panel 340 that provides a content notification view based on notifications generated in connection with instances of application services used by multiple projects (e.g., all of the projects that the user is associated with). Thus, the content notification panel 340 provides content that corresponds to an aggregation of notifications of different types (e.g., generated by different types of application services). The notifications can also be generated for different projects which the user is associated with.

Further, in an example of FIG. 3C, the content notification panel 340 includes an application notification 332 (e.g., daily update plugin that prompts a user to provide a status on a task or assignment), and one or more messaging notifications 334. Additionally, the notification content panel 340 can also render individual notifications with a corresponding response feature 335. Each response feature 335 enables the user to initiate and/or perform an operation (e.g., reply, view an attachment, compose a message, open a plugin or other application service, etc.).

As described with other examples, the notifications rendered on one or both of the content notifications panels 330, 340 can be selective. For example, the user-interface component 132 can implement predictive logic 165 to select which notifications are rendered on the notification aggregation view 340, where notifications that are deemed to be likely of interest (e.g., ones which user will view and/or respond to) are presented. In some implementations, notifications that are not selected for the content notification panel 340 can be rendered on a corresponding project-specific content notification panel 330, and/or within a content view of an application instance from which the notification was generated for a particular project. In some variations, the predictive determinations of whether individual notifications are to be rendered on the notification aggregation view 340 can be learned based on, for example, usage history of the relevant user or group account, or from other users that share one or more categorical aspects with the particular user.

As further shown by examples of FIG. 3B and FIG. 3C, at least some of the notifications can enable programmatic actions. By way of example, a user can interact with a notification of a project resource through the content notification panel 330. The user-interface component 132 can direct the input to, for example, the instance of the application service that generated the notification, so that the input results in an action to be performed by the respective application service. Further, in some examples, the user-interface component 132 can provide the user with predetermined responses, such as composed messages, prompts or other actions. In some variations, the determinations of the programmatic actions can be learned based on, for example, usage history of the relevant user or group account, or from other users that share one or more categorical aspects with the particular user.

Among other technical benefits, examples such as shown with FIG. 3B and FIG. 3C illustrate that the category-specific schema of the control panel 310 enables individual users to arrive at a point of action in one or two interactions (e.g., clicks, through pointer selection input, etc.). A point of action can correspond to, for example, an update generated by a project resource, such as in the case where an instance of an application service generates an alert to reflect activity by one or more users with respect to the corresponding project. When an alert is generated, the corresponding sub-nodal element 312, 314 representing the particular application instance can include an alert indicator. Additionally, the primary nodal element 316 may also be indicated by a visual element. Depending on implementation, the primary nodal element 316 can be alerted anytime one of the resources associated with the respect project is alerted, or alternatively, selected resources (e.g., such as represented by the prioritized sub-nodal element 314).

In the case where the alerting application instance corresponds to a prioritized sub-nodal element 314, the user may be able to view the alert status of the application instance by seeing an alert indicator with the corresponding sub-nodal element 314. Further, as described, the user may be able to view the alerted sub-nodal element 314, even when the corresponding primary nodal element 316 is in a collapsed or non-expanded state. Thus, the user may be able to view a list of projects on the control panel 310 (each represented by a corresponding primary nodal element 316) to detect the alerted resource (represented by a prioritized sub-nodal element 314), and the user may interact (e.g., click) the detected sub-nodal element 315 in order to view content corresponding application service content that corresponds to the point of action. In this way, the user can detect and arrive at the point of action for any particular project with one click.

Further, in examples when the alerting application instance (or other resource) corresponds to one of the sub-nodal elements 312 that are not prioritized, the user may view and select the alerted primary nodal element 316, causing the primary nodal element 316 to expand (or display resources) or alternatively provide project status panel 318. The user can then view and select the sub-nodal element 312 that represents the alerting application resource, in order to view the content that corresponds to the point of action. In this way, the user can detect and arrive at the point of action for any particular project with two clicks.

User Interface Methodology

Figure 4:
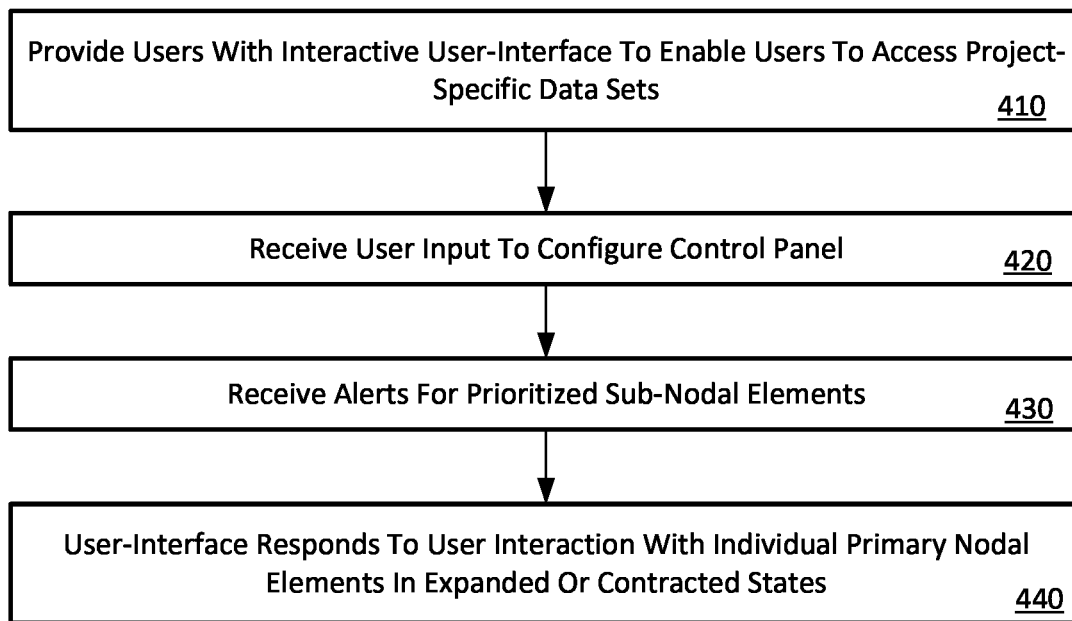
FIG. 4 illustrates a method for implementing an interactive user-interface for use with a communication system, according to one or more embodiments.

FIG. 4 illustrates a method for implementing an interactive user interface for use with a communication system, according to one or more embodiments. In examples, a method such as described with FIG. 4 can be implemented using a communication system 100, such as described with FIG. 1. Further, a method such as described with FIG. 4 can be implemented in connection with functionality described with a user-interface such as described with examples of FIG. 3A through FIG. 3C, and elsewhere in the application. Accordingly, in describing an example of FIG. 4, reference may be made to elements described with FIG. 1 and FIG. 3A through FIG. 3C, for purpose of illustrating suitable elements, components and functionality for performing a step or sub-step being described.

With reference to FIG. 4, the communication system 100 provides individual users with interactive user interface 300, in order to enable users to access project-specific data sets (410). In some examples, the user interface 300 can be web-based and implemented on user computing devices in a web-based environment. For example, the user interface 300 can be generated by the user-interface component 132, executed through the user's browser, using instructions communicated by one or more servers which implement, host or otherwise provide the communication system 100. In other examples, the user-interface component 132 can correspond to a web-based client application (e.g., mobile "app") that executes on the user device to generate the user-interface 300. In such examples, the user interface component 132 is implemented through instructions that are provided to the client device. The user interface component 132 can comprise a dynamic instruction set, where instructions are dynamically received and/or executed on the user computing device. The instructions can include programmatic code or scripts which execute responsive to user interactions with the user-interface 300 or other events, with the programmatic code or scripts being loaded onto the user computing device in response to user input or other events.

In examples, the user interface 300 includes control panel 310 and one or more content views 320, 330, 340. The control panel 310 can be structured to implement a project-based schema, where the control panel identifies the projects of a given user, and for each project, the tools and resources that are utilized by each project. As described with an example of FIG. 3, the control panel 310 can include primary nodal elements 316 that represent each user's projects, as well as sub-nodal elements 312, 314 that represent the tools and resources that are utilized by each project. Each tool or resource of a project can represent a type of data set that is specific for the project. As described with other examples, the tools of individual projects can include internal and external tools. The internal tools can correspond to an instance of an application service, such as a supplemental application service or plugin. The external tools can correspond to, for example, a link (e.g., URL, deep link, etc.) that is selectable to open external data set that is generated or maintained by an external or third-party application. By way of illustration, the external tool can correspond to an online document, file or third-party data set. Still further, the sub-nodal elements 312, 314 can include resource such as data sets (e.g., files, folders, directories, etc.).

In examples, the user interface 300 can receive user input to configure the control panel 310 (420). The user input to configure the control panel 310 can identify tools and resources that are to be represented by sub-nodal elements. Additionally, for each project, the user can specify input that identifies a set of prioritized sub-nodal elements 314.

In examples, the control panel 310 structures the primary nodal element 316 to have multiple states, including an expanded state and a collapsed state. Further, in examples, the primary nodal elements 316 can be arranged in a vertical direction on the control panel 310, and each primary nodal element 316 can be in either an expanded or collapsed state, independent of the state of other primary nodal elements 316 of the control panel 310.

In at least some examples, by default, each tool or resource that is identified for a given project may be represented as a sub-nodal element 312 that extends vertically from the corresponding primary nodal element 316 of the project. Further, the user can provide selection input to identify those tools that are to be represented as a prioritized sub-nodal element 314. In variations, the user-interface component 132 can monitor usage of individual tools for specific projects to identify those tools which are to be prioritized. For example, the prioritized tools of a project can include one or more tools that are most commonly or most recently used. While sub-nodal elements 312 can extend vertically relative to the associated primary nodal element 316, the prioritized sub-nodal element 314 can extend horizontally or row-wise adjacent or near the primary sub-nodal element 316.

Further, in examples, the prioritized sub-nodal elements 314 can receive alerts, reflecting events or updates that may occur to an underlying tool or resource (430). In some implementations, prioritized sub-nodal elements 314 can be alerted by way of a visual indication (e.g., red dot, color change, graphic affect) that appears or affects the appearance of the respective sub-nodal element. Similarly, the sub-nodal elements 312 can be provided with visual indications that reflect the underlying tool or resource as receiving an update. Additionally, primary nodal elements 316 can also be provided with visual indications, reflecting that the respective project has an update.

In examples, each primary nodal element 316 can be displayed in at least a collapsed state or an expanded state while the user interface 300 is responsive to user interaction with the control panel (440). When a primary nodal element 316 is collapsed, the primary nodal element 316 is displayed on the control panel 310 along with a set of prioritized sub-nodal elements 314, while non-prioritized sub-nodal elements 312 are hidden when the primary nodal element 316 is in the collapsed state. In some examples, the prioritized sub-nodal elements 314 are arranged horizontally, or in row-wise fashion, relative to the primary sub-nodal element 316. Further, the prioritized sub-nodal elements 314 are arranged horizontally or row-wise in a bar region 317 that is provided about or near the primary nodal element 316. A dimension of the bar region 317 can be dynamic and based on the number of prioritized sub-nodal elements, settings or preferences, display type or size, display area, etc.

When a primary nodal element 316 is in an expanded state, the control panel 310 expands the vertical region under the primary nodal element to display a collection of sub-nodal elements 312, 314 for that primary nodal element 316. The sub-nodal elements 312 can be arranged vertically. The user can, for example, select a particular primary nodal element 316 to expand it, then scroll vertically under the expanded primary nodal element to view and interact with the sub-nodal elements 312 that are associated with the primary nodal element 316.

In this way, the user can be enabled to scroll the control panel 310 to view primary nodal elements 316 in a collapsed or non-expanded state, along with prioritized sub-nodal elements 314 of the respective primary nodal elements 316 that are visible and accessible to the user. When a primary nodal element 316 is in the expanded state, the user can vertically scroll to view vertically-aligned sub-nodal elements 312, as well as viewing the prioritized sub-nodal elements 314 that are horizontally aligned relative to the respective primary nodal element 316.

In examples, the user-interaction that occurs with respect to the control panel 310 can be guided in-part by the presence of visual indicators that identify those tools and resources which have been updated or otherwise may require user attention. For example, the user can vertically scroll the control panel 310, with primary sub-nodal elements 316 in a collapsed or non-expanded state, to view the status of prioritized sub-nodal elements 314 of each primary nodal element 316. If a tool or resource represented by the prioritized sub-nodal element 314 is alerted (e.g., includes colored indicia), the user can choose to interact with the alerted prioritized sub-nodal element 314 in order to generate a content view that includes the update or event.

In examples, the user-interface component 132 loads and executes instructions for configuring the control panel 310, in response to user interactions with the control panel 310 and other events. In some examples, the user interface 300 can be structured to include a document object model (DOM), where contents of the user-interface 300 can be represented through programmatic elements (e.g., files, content elements, call functions and scripts, etc.) of the DOM. In examples, instructions and data, such as provided by the DOM, can load in response to the user selecting portions of the user-interface 300 to be visible in a frame, window or display area of the user computing device. When such instructions and data are loaded in response to user input or other events, corresponding portions of the user-interface 300 are updated and rendered to the user based on the loaded instructions and data. For example, portions of the DOM, representing a current state of the user-interface 300, can load responsive to user input to select nodal elements, as well as input where the user scrolls or navigates the control panel 310.

In the case where the user selects a primary nodal element 316, the primary nodal element 316 can change states, from a collapsed or non-expanded state to an expanded state. Once the select input is received to expand the primary nodal element 316, the user-interface component 132 can load the portion of the DOM that represents the expanded portion of the selected primary nodal element 316. However, when a primary nodal element 316 is in a collapsed state, portions of the DOM can remain dormant or un-loaded by the user-interface component 132.

This allows the user to scroll a list of projects on the control panel 310, where each of the corresponding primary nodal elements are in a collapsed or non-expanded state, without the user-interface component 132 loading portions of the DOM that reference expanded portions of the primary nodal element 316. Thus, the user-interface component 132 can enable the primary nodal elements 316 to be scrolled in a collapsed or non-expanded state, without loading the instructions/data associated with the respective primary nodal elements 316. As the user-interface component 132 does not load all of the instructions and data for primary nodal elements 316 when the primary nodal elements are in the collapsed state, the functioning of the user-interface is optimized to enable the user to scroll and navigate between primary nodal elements 316, without network and processing delays that may otherwise delay from loading instructions and data for individual projects.

Further, the user-interface component 132 can alert the prioritized sub-nodal elements 314 as to new events and updates, such that the user can view alerts to such sub-nodal elements while the corresponding primary nodal element 316 is in a collapsed or non-expanded state. Accordingly, in examples, the user can scroll the control panel 310 to view numerous primary nodal elements 316 in a collapsed or non-expanded state, along with prioritized sub-nodal elements 314 of the respective primary nodal elements 316. When prioritized sub-nodal elements 314 are alerted, the user can identify a point of action that may require the attention of the user, such as, for example, an internal tool receiving an update or notification. The user can perform scrolling to view alerts and identify points of action with respect to particular projects, without the user having to select the primary nodal element 316 of the alerted sub-nodal element 314. When the user views an alerted sub-nodal element 314, the user can interact with the sub-nodal element 314 to view the contents of the represented tool on, for example, a content panel 320. Accordingly, among other advantages, the user-interface component 132 can operate to enable a user to identify a point of action without the user clicking to view all of the sub-nodal elements 312 of the control panel 310. Further, the user can arrive at the point of action in one or two clicks, by, for example, selecting an alerted sub-nodal element 314 and viewing the alert or event on the control panel 320. Still further, the user can select to have the user-interface provide content views for a tool or resource of a project, without the user-interface component 132 loading instructions and data that pertain to tools and resources that are not prioritized. Thus, for example, in response to the user selecting one of the prioritized nodal elements 316 of a collapsed or non-expanded primary nodal element 316, the user-interface component 132 may load instructions and/or data for the selected tool, but not instructions or data for other tools of the represented project.

As described with various examples, the communication system 100 can implement a project-based schema to structure a control panel 310 of a user-interface in a manner that optimizes performance and usability of the user-interface component 132 and user-interface 300. Further, the horizontal or row-wise arrangement of prioritized sub-nodal elements 314 optimize the area (or real-estate) of the control panel 310, enabling the user-interface 300 to better accommodate user computing devices with smaller screen sizes (e.g., mobile devices, laptops, tablets, VR headsets, etc.).

Hardware Description

Figure 5:
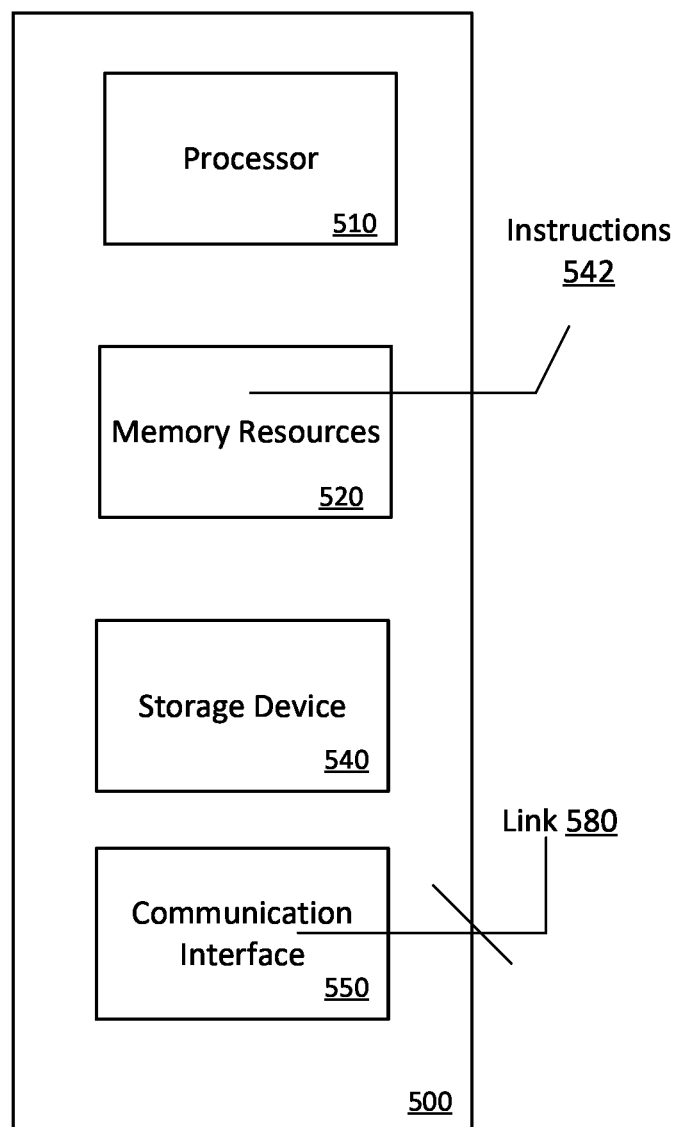
FIG. 5 illustrates a computer system on which one or more embodiments can be implemented.

FIG. 5 illustrates a computer system on which one or more embodiments can be implemented. A computer system 500 can be implemented on, for example, a server or combination of servers. For example, the computer system 500 may be implemented as part of the of an example of FIG. 1. Likewise, the computer system 500 can implement a method such as described with an example of FIG. 2A, FIG. 2B and FIG. 4.

In one implementation, the computer system 500 includes processing resources 510, memory resources 520 (e.g., read-only memory (ROM) or random-access memory (RAM)), a storage device 530, and a communication interface 550. The computer system 500 includes at least one processor 510 for processing information stored in the main memory 520, such as provided by a random-access memory (RAM) or other dynamic storage device, for storing information and instructions which are executable by the processor 510. The main memory 520 also may be used for storing temporary variables or other intermediate information during execution of instructions to be executed by the processor 510. The computer system 500 may also include the memory resources 520 or other static storage device for storing static information and instructions for the processor 510. The storage device 530, such as a magnetic disk or optical disk, is provided for storing information and instructions.

The communication interface 550 enables the computer system 500 to communicate with one or more networks (e.g., cellular network) through use of the network link 580 (wireless or a wire). Using the network link 580, the computer system 500 can communicate with one or more computing devices, specialized devices and modules, and one or more servers. The executable instructions stored in the memory 520 can include instructions 552, to implement a network communication system such as described with an example of FIG. 1. The executable instructions stored in the memory 520 may also implement a method, such as described an example of FIG. 2A.

As such, examples described herein are related to the use of the computer system 500 for implementing the techniques described herein. According to an aspect, techniques are performed by the computer system 500 in response to the processor 510 executing one or more sequences of one or more instructions contained in the memory 520. Such instructions may be read into the memory 520 from another machine-readable medium, such as the storage device 530. Execution of the sequences of instructions contained in the memory 520 causes the processor 510 to perform the process steps described herein. In alternative implementations, hard-wired circuitry may be used in place of or in combination with software instructions to implement examples described herein. Thus, the examples described are not limited to any specific combination of hardware circuitry and software.

Conclusion

Although examples are described in detail herein with reference to the accompanying drawings, it is to be understood that the concepts are not limited to those precise examples. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude having rights to such combinations.

What is claimed is:

1. A network computer system comprising:
one or more processors;
a memory to store a set of instructions;
wherein the one or more processors execute the set of instructions to perform operations that include:
generating a user-interface that includes a control panel;
wherein generating the user-interface includes providing an interactive framework that includes a plurality of primary nodal elements, the interactive framework being structured in accordance with a schema that represents each of multiple projects as a corresponding primary nodal element of a plurality of primary nodal elements provided on the control panel; and
wherein the plurality of primary nodal elements include a first primary nodal element that represents a first project, the first project being associated with a set of multiple application services of different types, the set of multiplication services being represented by a corresponding set of multiple sub-nodal elements, with each sub-nodal element of the corresponding set representing one of the application services of the set of multiple application services;
wherein each primary nodal includes multiple states, including (i) an expanded state, in which a display area for the corresponding project is expanded on the control panel, and (ii) a contracted state, in which a display area for the project on the control panel is contracted relative to the expanded state; and
wherein when the first primary nodal element is in the contracted state, the corresponding set of multiple sub-nodal elements are arranged horizontally on the control panel in proximity to the first primary nodal element, each sub-nodal element of the corresponding set being selectable to provide a corresponding content view of the application service represented by that sub-nodal element on either the control panel or an adjacent panel.

2. The network computer system of claim 1, wherein each of the plurality of primary nodal elements includes a project name of the corresponding project represented by that primary nodal element.

3. The network computer system of claim 1, wherein the corresponding set of multiple sub-nodal elements are arranged horizontally in accordance with an ordering that is based on user input.

4. The network computer system of claim 1, wherein the set of multiple application services includes a communication service, and a corresponding sub-nodal element of the corresponding set of multiple sub-nodal elements is selectable by a user to view content for a corresponding communication channel of the communication service.

5. The network computer system of claim 1, wherein the corresponding set of multiple sub-nodal elements includes a sub-nodal element that is selectable to render a notification aggregation view, the notification aggregation view including content that is based on an aggregation of notifications generated by two or more of the multiple application services of the set.

6. The network computer system of claim 1, wherein the set of multiple application services includes one or more plugins.

7. The network computer system of claim 6, wherein the set of sub-nodal elements are arranged horizontally and row-wise on the control panel.

8. The network computer system of claim 7, wherein in the expanded state, the first primary nodal element includes a second set of sub-nodal elements that are arranged vertically on the control panel below the first primary nodal element.

9. The network computer system of claim 1, wherein the operations further include providing a status indicator with a sub-nodal element of the corresponding set of multiple sub-nodal elements, the status indicator indicating whether a content view of a corresponding application service has been updated or previously viewed by the user.

10. A non-transitory computer-readable medium that stores instructions that when executed by one or more processors of a computer system, cause the computer system to perform operations that include:

generating a user-interface that includes a control panel; and wherein generating the user-interface includes providing an interactive framework that includes a plurality of primary nodal elements, the interactive framework being structured in accordance with a schema that represents each of multiple projects as a corresponding primary nodal element of a plurality of primary nodal elements provided on the control panel;

wherein the plurality of primary nodal elements include a first primary nodal element that represents a first project, the first project being associated with a set of multiple application services of different types, the set of multiplication services being represented by a corresponding set of multiple sub-nodal elements, with each sub-nodal element of the corresponding set representing one of the application services of the set of multiple application services;

wherein each primary nodal includes multiple states, including (i) an expanded state, in which a display area for the corresponding project is expanded on the control panel, and (ii) a contracted state, in which a display area for the project on the control panel is collapsed or not expanded; and wherein when the first primary nodal element is in the contracted state, the corresponding set of multiple sub-nodal elements are arranged horizontally on the control panel in proximity to the first primary nodal element, each sub-nodal element of the corresponding set being selectable to provide a corresponding content view of the application service represented by that sub-nodal element on either the control panel or an adjacent panel.

11. The non-transitory computer-readable medium of claim 10, wherein the corresponding set of multiple sub-nodal elements are arranged horizontally in accordance with an ordering that is based on user input.

12. The non-transitory computer-readable medium of claim 10, wherein the set of multiple application services includes a communication service, and a corresponding sub-nodal element of the corresponding set of multiple sub-nodal elements is selectable by a user to view content for a corresponding communication channel of the communication service.

13. The non-transitory computer-readable medium of claim 10, wherein the corresponding set of multiple sub-nodal elements includes a sub-nodal element that is selectable to display a notification aggregation view, the notification aggregation view including content that is based on an aggregation of notifications generated by two or more of the multiple application services of the set.

14. The non-transitory computer-readable medium of claim 10, wherein the set of multiple application services includes one or more plugins.

15. The non-transitory computer-readable medium of claim 14, wherein the set of sub-nodal elements are arranged horizontally and row-wise on the control panel.

16. The non-transitory computer-readable medium of claim 10, wherein the operations further include providing a status indicator with a sub-nodal element of the corresponding set of multiple sub-nodal elements, the status indicator indicating whether a content view of a corresponding application service has been updated or previously viewed by the user.

17. A method for providing multiple application services to a group of users, the method being implemented by one or more processors and comprising:

generating a user-interface that includes a control panel; wherein generating the user-interface includes providing an interactive framework that includes a plurality of primary nodal elements, the interactive framework being structured in accordance with a schema that represents each of multiple projects as a corresponding primary nodal element of a plurality of primary nodal elements provided on the control panel, and wherein the plurality of primary nodal elements include a first primary nodal element that represents a first project, the first project being associated with a set of multiple application services of different types, the set of multiplication services being represented by a corresponding set of multiple sub-nodal elements, with each sub-nodal element of the corresponding set representing one of the application services of the set of multiple application services;

wherein each primary nodal includes multiple states, including (i) an expanded state, in which a display area for the corresponding project is expanded on the control panel, and (ii) a contracted state, in which a display area for the project on the control panel is collapsed or not expanded; and wherein when the first primary nodal element is in the contracted state, the corresponding set of multiple sub-nodal elements are arranged horizontally on the control panel in proximity to the first primary nodal element, each sub-nodal element of the corresponding set being selectable to provide a corresponding content view of the application service represented by that sub-nodal element on either the control panel or an adjacent panel.

18. The method of claim 17, wherein the corresponding set of multiple sub-nodal elements are arranged horizontally in accordance with an ordering that is based on user input.

19. The method of claim 17, wherein the set of multiple application services includes a communication service, and wherein in response to a user selecting a corresponding sub-nodal element of the corresponding set of multiple sub-nodal element, the method further comprises generating a content view for a corresponding communication channel of the communication service.

20. The method of claim 17, wherein the operations further include providing a status indicator with a sub-nodal element of the corresponding set of multiple sub-nodal elements, the status indicator indicating whether a content view of a corresponding application service has been updated or previously viewed by the user.

* * * * *